United States Patent [19]

Halleron

[11] 4,261,838
[45] Apr. 14, 1981

[54] BY-PASS OIL FILTRATION SYSTEM FOR INTERNAL COMBUSTION ENGINES

[76] Inventor: Lee Halleron, 5508 Coxson Rd., Richmond, Va. 23231

[21] Appl. No.: 956,603

[22] Filed: Nov. 1, 1978

[51] Int. Cl.$^3$ .............................................. B01D 19/00
[52] U.S. Cl. ...................................... 210/774; 55/55; 55/192; 196/128; 210/805; 210/168; 210/180
[58] Field of Search ...................... 196/46.1, 111, 128; 210/70, 71, 168, 180–182, 184, 186, 443, 444, DIG. 17; 55/36, 55, 192

[56] References Cited

U.S. PATENT DOCUMENTS

| | | | |
|---|---|---|---|
| 806,696 | 12/1905 | Moody | 55/55 X |
| 1,031,942 | 7/1912 | Leblanc | 55/55 X |
| 1,036,806 | 8/1912 | DesMaroux | 55/55 X |
| 1,234,327 | 7/1917 | Gallsworthy | 196/128 |
| 1,816,573 | 7/1931 | Ellis et al. | 210/168 X |
| 2,068,394 | 1/1937 | Burckhalter et al. | 210/181 X |
| 2,088,243 | 7/1937 | Koinzan | 210/180 X |
| 2,133,359 | 10/1938 | Miller | 210/180 X |
| 2,346,042 | 4/1944 | Morris | 210/180 X |
| 2,428,939 | 10/1947 | Morris | 210/180 X |
| 2,635,759 | 4/1953 | Schwalge | 210/180 X |
| 2,785,109 | 3/1957 | Schwalge | 210/180 X |
| 2,797,767 | 7/1957 | Brooke et al. | 55/55 X |
| 2,989,143 | 6/1961 | Hallstrom | 55/55 X |
| 3,550,781 | 12/1970 | Barrow | 210/184 X |

FOREIGN PATENT DOCUMENTS

| | | | |
|---|---|---|---|
| 109385 | 12/1943 | Sweden | 55/192 |
| 982466 | 2/1965 | United Kingdom | 210/DIG. 17 |

*Primary Examiner*—Robert H. Spitzer
*Attorney, Agent, or Firm*—Elizabeth Newton Dew; Arthur Wells Dew

[57] ABSTRACT

A small portion of oil being circulated by the engine's pump is constantly diverted to a specially-constructed filter where solid contaminant particles are intercepted. The oil still under pressure is then directed to a dehydration chamber wherein its pressure is reduced and it is directed through a heat-exchange pipe and drops onto a horizontal spreader plate pierced by a multiplicity of small apertures distributed over its relatively large area. Spreading of the oil in a thin layer over the plate effects vaporization of liquid contaminants therein. The vapors are drawn off from the top of the chamber by vacuum and dispensed to ambient air or recirculated to the carburetor. Purified oil flows by gravity from the chamber to the crankcase.

13 Claims, 7 Drawing Figures

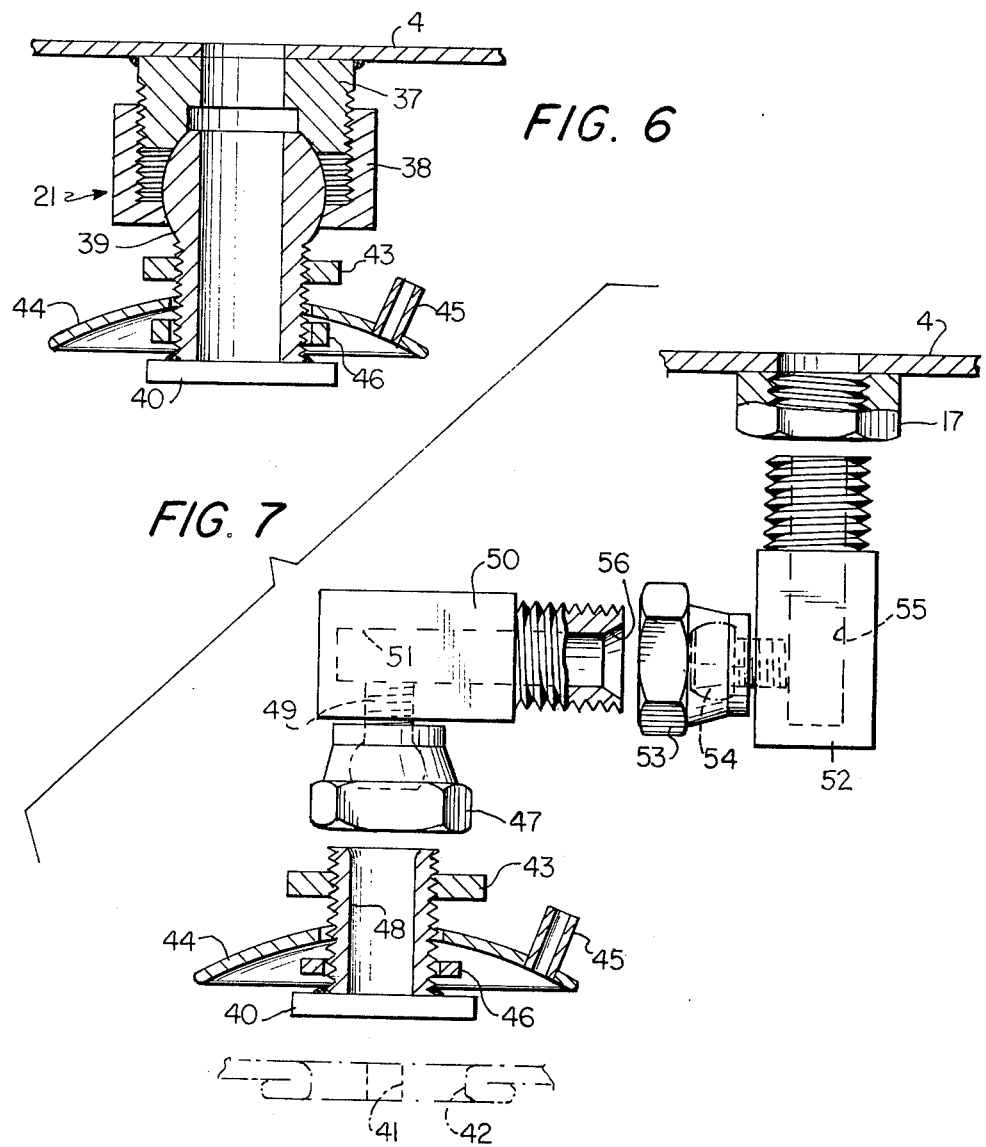

BY-PASS OIL FILTRATION SYSTEM FOR INTERNAL COMBUSTION ENGINES

BACKGROUND OF THE INVENTION

The present-day practice with many millions of internal combustion engines, especially those powering motor vehicles, is to periodically drain the crankcase oil, on a time-of-use or mileage basis and to simply throw it away. The fact is, however, that the oil does not wear out. It merely becomes contaminated with dirt, particles of carbon and metal, water, acid and vaporizable fuel components. This waste of oil amounts to millions of gallons each year and is obviously a very important consideration in the present shortage of domestically-produced petroleum and which at this time requires the purchase and importation from abroad of about one-half of the nation's petroleum requirements.

Clearly, too, if those solid and vaporizable liquid contaminants could be continuously separated from the oil while in use, a given charge of crankcase oil could be used indefinitely, and certainly for 50,000 miles in the case of a motor vehicle, possibly much longer. As the twenty billions of dollars and more, required annually to pay for petroleum imported from foreign countries, are the principal cause of our huge balance-of-payments deficit, it is very clear that the waste of oil involved in the present practice of simply throwing away contaminated crankcase oil, is intolerable and inexcusable. The practice also results in increased pollution of sewers and streams.

SUMMARY OF THE INVENTION

The purpose of the present invention is to provide a filtration system for internal combustion engines such as those powering passenger vehicles, trucks, boats and industrial implements, wherein a portion of the oil being constantly re-circulated under pressure, is by-passed, cleansed of solid contaminant particles down to a very small size, followed by the evaporation and discard of liquid contaminants. The fully cleansed oil is then returned by gravity to the engine's crankcase. Thus the main body of oil is constantly cleansed, remains essentially free of contaminants both solid and liquid, and may be used indefinitely subject only to periodic and simple replacement of the filter unit or component. Since the main body of oil remains clean and does not, as under present practice, become progressively fouled by contaminants, the life of the engine is prolonged, vast quantities of petroleum are saved and much pollution avoided. Apart from periodic renewal of the filter unit, the life of the component parts of my invention is indefinite.

A further object is to provide a system of the type aforesaid, which is easily installed with the use of only a few simple tools and because of its rugged and high quality construction, of indefinite useful life.

Another object is to provide a filtration system which is versatile in its ready adaptation to a large number of types, makes, sizes and models of internal combustion engines, and which is conveniently transferrable from one engine to another, as may be necessary or desired.

A further object is to provide a novel and useful method of cleaning the charge of oil used to continuously lubricate an internal combustion engine.

Other objects and advantages of my invention will become clear to those skilled in the art, after a study of the following detailed description, in connection with the accompanying drawing.

BRIEF DESCRIPTION OF THE DRAWING

FIG. 6 is a vertical axial section showing first means for angularly adjustably mounting the dehydration chamber on an engine and fixing it in such position; and FIG. 7 is an elevation partly in section, showing second means for mounting, angularly adjusting and fixing the dehydration chamber on an engine.

DESCRIPTION OF THE PREFERRED EMBODIMENT

Figure 1:
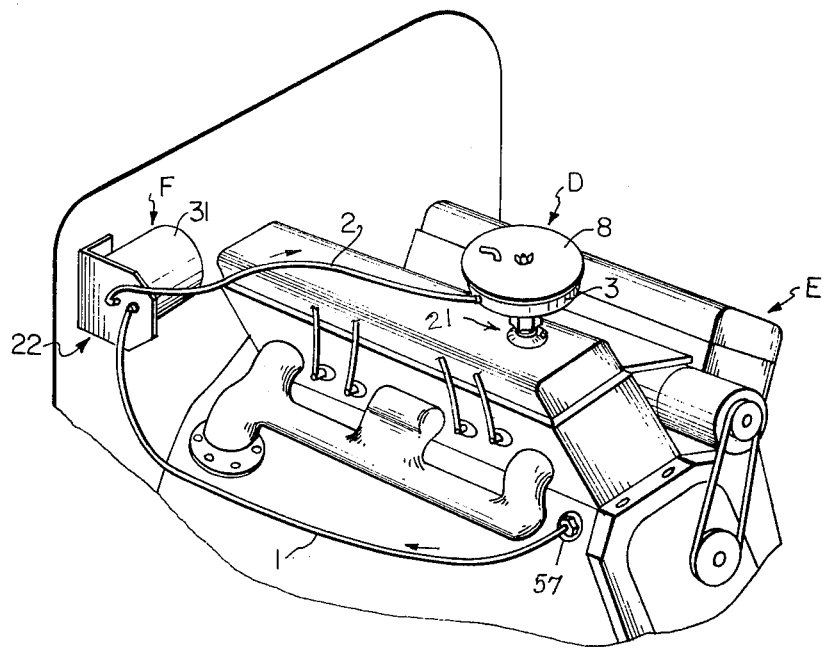
FIG. 1 is a perspective diagrammatic view showing the several component parts of the invention and their general relation and connection to one another and to the engine.

Referring to FIG. 1 there is indicated at E, a V-8 internal combustion engine equipped with the invention and consisting basically of a filter generally identified at F, and a dehydration chamber indicated at D. Oil under pressure flows through flexible hose 1 from a suitable take-off point 57 on the engine, to filter F where, after removal of solid contaminant particles down to at least 5 microns in size and below, it is conducted through flexible pressure hose 2, to chamber D. In this chamber the pressure is reduced to near atmospheric and the flow of oil is converted to an attenuated thin film of large area and then to a multiplicity of filamentary streams, whereby the liquid contaminants are vaporized and withdrawn under low vacuum.

Figure 2:
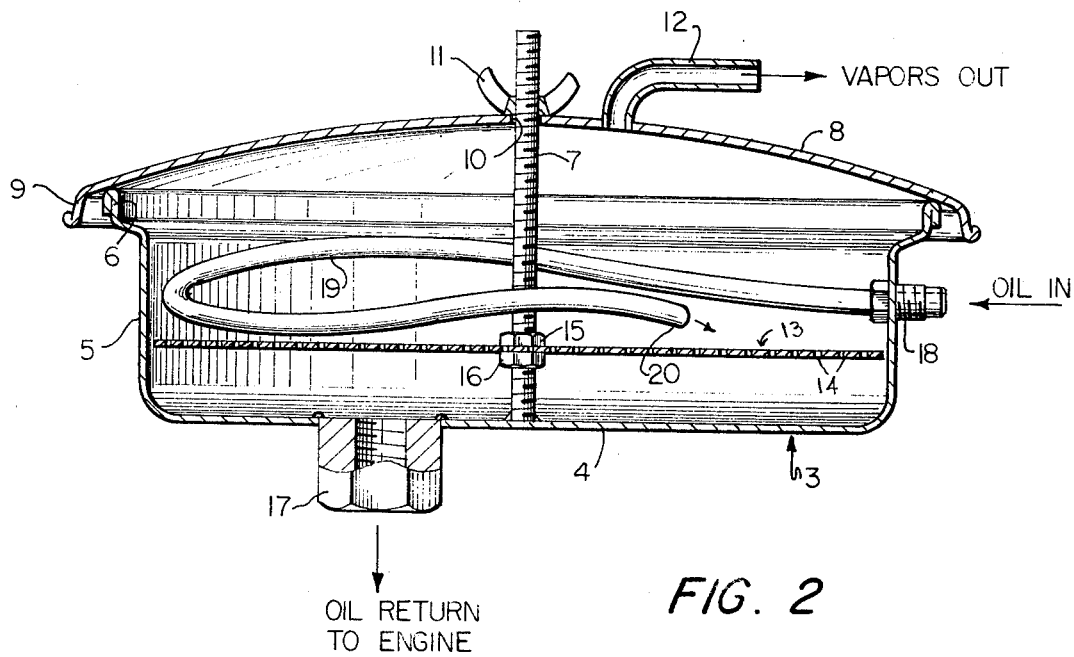
FIG. 2 is a vertical, axial or central cross section to a scale enlarged over FIG. 1, of the dehydration chamber or receptacle.

FIG. 2 shows to an enlarged scale the construction of the dehydration chamber or unit. A shallow pan or receptacle 3 is preferably constructed of polished stainless steel. It has a flat circular bottom 4 with upstanding wall 5 expanded in diameter at its rim, which is curled or turned downwardly at 6. A machine screw 7 has its lower end welded or otherwise rigidly secured in and to the center of bottom 4. An arched cover 8 has its rim flanged downwardly and, as shown, its edge curled outwardly and upwardly to afford strength and rigidity. A central hole 10 in the cover receives screw 7 with a sliding fit. A wing nut 11 threaded onto the screw holds the cover firmly on the beaded or turned-down rim 6 of pan 3, to have continuous circumferential contact therewith. It is noted that as pressure within the enclosure thus formed is substantially atmospheric, no gasket between the rim and cover is normally required for a fluid-tight seal. However, a gasket, not shown, may be used if desired. A short curved section of pipe 12 of about ⅛" size has one end welded or otherwise fixed in a hole through the cover, radially offset from hole 10. The pipe has an essentially 90° bend and as will be subsequently explained in detail, is installed so that the free end thereof is directed rearwardly relatively to the direction of travel of the vehicle or in the case of a stationary installation, relatively to the flow of cooling air.

A circular plate 13, preferably of stainless steel, has a free fit within the pan and is perforated over its area with a multiplicity of small holes 14 having about the diameter of a #55 drill. The holes are closely spaced and in regular geometrical arrangement. A central hole in the plate enables it to slide down over screw 7, to be clamped between nuts 15, 16 threaded thereon. Bottom 4 is provided with a hole within which a fitting 17 is rigidly secured as by welding. As will be subsequently described, this fitting provides not only conduit means for returning purified oil to the engine but also may conveniently act as a part of a firm but adjustable mount or support by which the dehydration chamber and in particular its plate 13 may be adjusted to and held in normally horizontal position.

Wall 5 is provided with an opening in which is rigidly fixed a fitting 18 for pressure-tight connection to one end of flexible hose 2 (FIG. 1). One end of a spiral or helical length of pipe 19, which may be of copper, is also welded or soldered to fitting 18. The pipe makes an essentially 360° turn within the pan and has its radially-inward end open and so disposed that oil coming from filter unit F drops onto plate 13, is spread thereby and dispersed into a multiplicity of small streams or filaments of large total area. The oil then collects on pan bottom 4 and exits through fitting 17. A mounting and return conduit assembly 21, FIGS. 1 and 6, subsequently described in detail forms an adapter for connection with the oil-filling opening such as the one commonly located in the valve rocker cover of engines. By the use of mounting 21, unit D may be angularly adjusted so that plate 13 is fixed and held in normally horizontal position.

Figure 3:
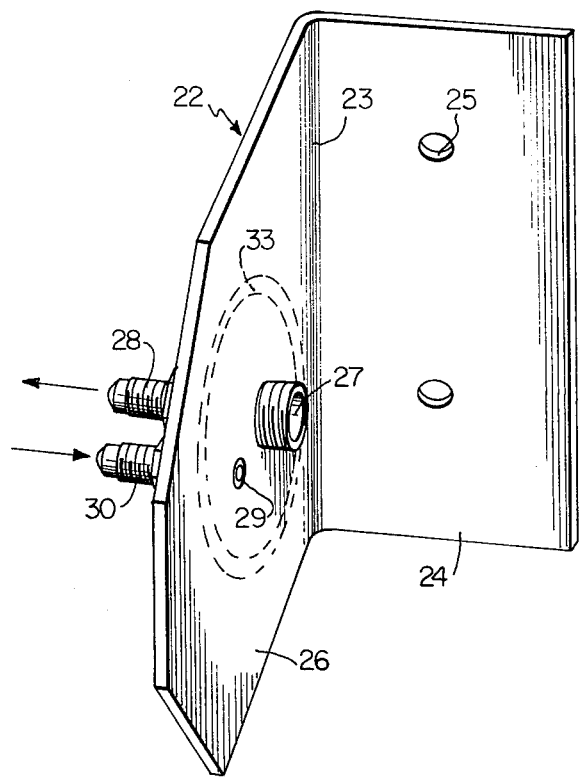
FIG. 3 is a perspective view to an enlarged scale, of the mounting bracket for the spin-on filter cartridge.
Figure 4:
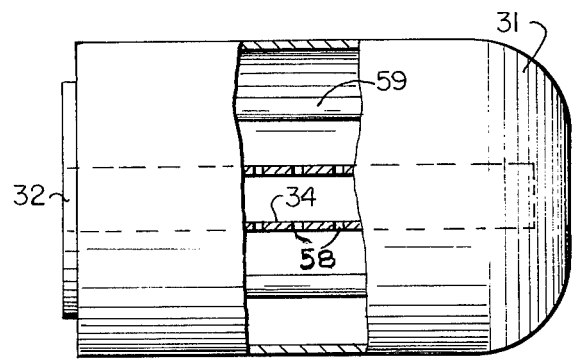
FIG. 4 is a side elevation, partly in section, of the filter cartridge.
Figure 5:
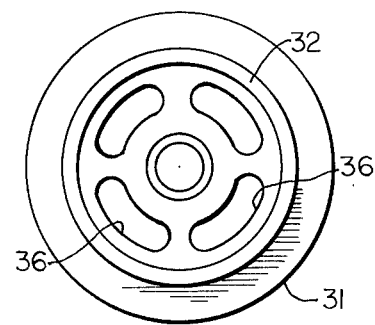
FIG. 5 is a front elevation of the cartridge.

FIG. 3 shows a bracket 22 preferably of heavy-gauge stainless steel and consisting of an initially rectangular plate bent 90° along a line 23 parallel with and about midway between two oppposed edges to form a first planar portion 24 pierced with mounting holes 25, and a second portion 26 having its corners truncated for lightening the assembly. The central area of portion 26 is provided with a hole into which is threaded or otherwise fixed, a nipple 27 sized to engage the threaded hole of a selected spin-on type of filter can shown upon FIGS. 4 and 5. The nipple may be integral with or rigidly integrated with a pressure-tight connection 28 receiving the coupling of one end of flexible tube 2, as shown upon FIG. 1.

A hole 29 through portion 26 is radially offset from nipple 27 and is in pressure-tight communication with a second connection ion or nipple 30, sized and adapted for fluid-tight connection with one end of flexible hose 1, FIG. 1. The surface of portion 26 shown upon FIG. 3, is planar, smooth and polished so that when can 31 is threaded in a conventional manner onto nipple 27, gasket 32 thereof is forced against the surface of 26 to make a circular, pressure-tight seal therewith as is indicated in dotted lines 33, FIG. 3. As hole 29 is within this circle of contact, oil forced in at 30 exits through nipple 27 after being filtered. The can assemble includes a central interior tube 34 having a multiplicity of perforations 58 in and through its walls and integrally fixed axially with the internally-threaded fitting screwed onto nipple 27 by turning of the can.

Can 31 encloses a filter element formed of longitudinally-pleated plastic-coated paper such as "Microlite" manufactured by James River Paper Company, Richmond, Va. This material is very effective in intercepting and retaining solid contaminant particles suspended in the oil, down to five microns and less in size.

FIG. 6 shows in axial cross section one means by which the dehydration chamber of FIG. 2 may be mounted upon the engine for angular adjustment to horizontalize plate 13, to maintain it in that position and to conduct purified oil from the chamber, back to the engine. At 4 is indicated a portion of the pan or chamber bottom. A tubular plug 37 has a flat upper end welded, soldered or otherwise rigidly attached to bottom 4 coaxially of the aperture therein. The lower end of the plug is threaded to receive an internally threaded cup-like collar 38 having an apertured and inwardly-flanged lower portion, and shaped and sized for a fluid-tight fit on and about the spherically-bulbous upper end of a tubular nipple 39 with threaded lower end. A bar 40 which may be square in transverse section, is welded in diametrically fixed relation with the lower end of the nipple. Thus as will be clear from inspection of FIG. 6, loosening of nut 38 enables a limited angular adjustment between the nipple and plug, after which, tightening of the nut forces the bulbous end of the nipple onto the reciprocally-shaped seat in the plug and fixes the two in such angular relation that bottom 4 of the pan 3 and the perforated plate therein, are horizontal when the vehicle being equipped with the invention, is resting on an essentially horizontal surface.

Bar 40 projects at its ends and is sized for a fair fit through the diametrically-opposed bayonet slots such as 41, FIG. 7, in the oil-filling opening 42 of the engine. A nut 43, FIGS. 6 and 7, is threaded on nipple 39 and when turned down from the position shown, engages an arched washer 44 centrally apertured for a sliding fit on and along the stem of the nipple. The washer is provided with a short tubular element 45 having one end soldered or welded in an opening in the washer for pressure equalization. A plain metal band or ring 46 has a sliding fit on and along the threaded nipple, and is interposed between bar 40 and washer 44. Thus when the oil filler cap of the engine is removed, bar 40 can be inserted with its ends passing through bayonet slots 41 therein, then turned so that beaded edge 42 obstructs removal thereof. Then nut 43 is turned down to force the rim of washer 44 against the exterior surface of the engine and thus fix the assembly in place. After this operation, nut 38 may be backed off and the dehydration chamber properly angularly adjusted. Tightening of the nut fixes the chamber in proper horizontal position.

FIG. 7 shows a second form of mounting means for the dehydration chamber. In this figure the parts 40 through 46 shown upon FIG. 6 may be used and are identified by corresponding reference numerals. A coupling nut 47 is adapted to thread onto stem 48. The stem as shown is a plain tubular element and has bar 40 welded thereto as described in connection with FIG. 6. Nut 47 has its upper end swaged inwardly about the bulbous partly-spherical end of stem 49 threaded into a hole in the end of connector 50 having bore 51 extending from its right threaded end. The connector or adapter 52 may be a duplicate of item 50 so that it is sufficient to identify coupling nut 53, bulbous threaded stem 54 and bore 55. The threaded upper end of connector 52 is adapted to turn into fitting 17 fixed in bottom 4 of pan 3. See FIG. 2 also. Thus when nuts 47 and 53 are firmly threaded onto their respective stems, a liquid-tight passage is afforded to return purified oil from pan to engine. Further, connector 52 and its attached dehydration pan are thus mounted for universal adjustment about two mutually-normal axes, the first being conicident with the axis of bore 51 and the second being coincident with the axis of stem 48. Pan 3 and its plate 13 are thus readily horizontalized for any angular position of pre-emplaced stem 48 relatively to the vertical. After that, nuts 47 and 53 are tightened to maintain the adjusted position and to firmly support the pan. No other support is required. In each case the end of the nut is loosely swaged about the bulbous end of its stem 49 or 54 so that it may freely turn thereon and in response to tightening, forces its bulbous end onto the seal such as 56, FIG. 7.

Attachment of one swivel coupling at the end of flexible pressure tube 1, to the oil pump outlet of the engine, may be effected in several ways. One satisfactory way is by way of the oil pressure sensor gauge take-off. As is well known, most engines are equipped with a pressure-responsive switch threaded in or otherwise secured to the engine block, and consisting of a diaphragm having one side directly connected to the outlet of the engine's oil pump, to be flexed by and proportionally to the instantaneous pressure. Flexing of the diaphragm controls a switch in circuit with a lamp on the vehicle's control panel. The wiring is such that the switch is closed only when the oil pressure is dangerously low.

The sensor thus provided as a standard item of the vehicle, is threaded or otherwise connected pressure tight to the engine block so that it may be simply removed and replaced by an adapter or tee threadable into the block in place of the sensor and having first connector means to which the sensor gauge may be threadedly coupled, and second connector means to which one end of tube 1 is connected. Thus normal operation of the sensor gauge remains as before, while a by-pass is provided so that a portion of the total flow impelled by the pump, passes under operating pressure to filter unit F.

INSTALLATION AND OPERATION

Installation of the invention will be generally clear from the foregoing description. The sequence of steps in installation as set forth in the following paragraphs, is satisfactory and but one of numerous variations. Any suitable area of the fire-wall or fender, under the hood, may be selected for filter F. Holes for bracket 22 are drilled, using the bracket itself as a gauge, and self-tapping screws through holes 25 fix it in place. The oil sensor gauge as indicated at 57, FIG. 1, is replaced by the adapter supplied as a part of the equipment and then the sensor is replaced by attachment to the adapter. Using the mount of FIG. 7 for example, the oil filler cap of the engine is removed and set aside. Bar 40 is lowered through the grooves 41 of the oil opening and turned through, say, 90°. Ring 46, washer 44 are slid down over stem 48 and nut 43 is turned down tightly to secure the stem in position on the engine.

Nuts 47 and 53 are threaded on in the manner clear from inspection of the figure and are slightly tightened. Fitting 17 of pan 3 is threaded onto connector 52 and tightened. One end of flexible tube 1 is threaded into the second outlet of the tee or adapter at location 57, FIG. 1. The tube is dressed along a selected free path to filter F and its second end tightened onto nipple 30. One end of tube 2 is threaded onto outlet 28 of the filter and this tube is dressed along a free path to fitting 18 of the dehydration unit and tightened thereon.

With the vehicle standing on a level surface, pan 3 is tilted and angularly adjusted until plate 13 is essentially level. Nuts 47 and 53 are then turned tight to maintain the adjustment and to firmly support the pan. Cover 8 is emplaced and nut 11 is turned down snugly as shown upon FIG. 2. This completes installation and the engine is now started. After a brief time of 30 to 60 seconds, oil will begin to flow from pipe 19. As the pressure in pan 3 is substantially atmospheric, cover 8 may be initially left off until flow of oil begins. In any event, the cover is replaced with pipe 12 directed rearwardly so that forward motion of the vehicle produces a low vacuum in the pan and withdraws vaporized contaminants. If desired, one end of a rubber tube may be slid over the end of pipe 12 and its other end connected to tubular element 45, FIG. 7, so that the vapors are mixed with and dispersed with other crankcase vapors.

In operation, a portion only of the total volume of oil impelled by the engine's pump, is diverted or by-passed through tube 1, etc. At about 30 psi the entire body of oil is cleaned on an average of twelve times for each hour of vehicle operation. Because the oil if thus continuously cleaned of particulate and liquid contaminants, it remains substantially clean and clear and may be used indefinitely as, for instance, for 50,000 miles of operation. Thus the invention pays for itself in a relatively short time by practically eliminating oil changes presently deemed necessary. Wear on the engine is also reduced and its useful life is correspondingly increased. The potential savings of petroleum is, as has been previously noted, vast and impressive.

I claim:

1. The method of continuously purifying a main charge of lubricating oil circulating under pressure in an internal combustion engine, comprising, diverting under pressure a portion only of the total flow of oil, passing said portion continuously through a filter element to remove contaminant particles therefrom, reducing the pressure of the oil, downstream of the filter, to near atmospheric, gravitationally forming the oil thus purified, into a multiplicity of downwardly vertical filamentary streams to evaporate therefrom the liquid contaminants, and collecting and returning to the main charge, the oil thus purified.

2. The method of claim 1, said reduction of pressure being effected by passing the oil through a length of tubing of heat exchange material.

3. The method of purifying a body of lubricating oil circulating under pressure in an internal combustion engine, comprising, diverting a portion of the body of oil under pressure, to an enclosed space, forming of said portion, in said space, a multiplicity of contiguous, discrete, filamentary, gravitationally descending streams to evaporate and remove volatile contaminants from said portions, collecting and re-uniting said streams into a unitary flowing stream, and directing the re-united flowing stream back to the engine.

4. In an oil purifying system for an internal combustion engine, means forming a closed chamber having a top, bottom and side walls, a normally horizontal planar plate disposed in said chamber and having therethrough a multiplicity of apertures disposed over its area in closely-spaced, geometrically-arranged relation, first conduit means connected with said walls and effective to deposit a stream of oil from above and onto said plate for dispersal thereby and formation through said apertures into a multiplicity of gravitationally-impelled downwardly-flowing filamentary streams, second conduit means connected with said chamber, to conduct oil therefrom after transversing the apertures in said plate, and means operable to withdraw contaminant vapors thus produced, from said chamber.

5. The system of claim 4, said first conduit means including a pressure-reducing pipe spirally disposed in said chamber, about a normally-vertical axis, and having its radially-outward end fixed in pressure-tight relation in and through an opening in said side wall.

6. The system of claim 4, said side wall upstanding from said bottom wall, said top wall removably fitting over said side wall, and operable means removably securing said top wall in position over and in continuous peripheral contact with the rim of said side wall.

7. The system of claim 6, a tubular fitting fixed with said bottom wall concentrically of an opening therethrough, and third conduit means adapted to connect said tubular fitting with the oil filler opening of an engine, and to angularly adjustably mount said chamber-forming means to the engine.

8. The system of claim 7, said third conduit means including at least one ball joint having a center about which said bottom wall may be universally angularly adjusted.

9. The system of claim 6, said bottom wall being planar, said operable means comprising a normally-vertical screw having one end fixed in and centrally of said bottom wall, and nuts threaded on said screw and engaging respective opposite sides of said plate, to hold the same fixed in said chamber, in parallel with said bottom wall.

10. The system of claim 9, said screw passing upwardly through a central opening in said top wall, and a nut threaded on said screw and engaging and retaining said top wall removably in position, as aforesaid.

11. The system of claim 9, a second tubular connection fixed in and through said bottom wall, adapter means for fixing to an engine in communication with the oil-circulating pump thereof, and a second flexible tube having its ends connected with said second tubular connection and said adapter means, respectively.

12. The system of claim 4, a first tubular inlet connection fixed in and through said side wall, a filter element for particulate contaminants and comprising a closed can and inlet and outlet tubular connections into and out of said can, bracket means for fixedly mounting said filter element on a motor vehicle, and a first flexible tube having its ends connected with said filter outlet connection and said first tubular inlet, respectively.

13. The system of claim 12, said bracket means including a projecting planar wall portion, threaded nipple means secured centrally in and through an aperture in said wall portion and projecting from both sides thereof, the contiguous end of said first flexible tube threadedly engaging one projecting end of said nipple means, said outlet tubular connection of said can, threadedly engaging the other projecting end of said nipple means.

* * * * *